United States Patent
Tiemeyer et al.

(10) Patent No.: US 9,626,139 B2
(45) Date of Patent: Apr. 18, 2017

(54) NETWORK PRINTING SYSTEM FOR TRANSFERRING PRINT JOBS BASED ON NUMBERS OF PAGES

(71) Applicant: Canon Europa N.V., Amstelveen (NL)

(72) Inventors: Dirk Tiemeyer, Bad Iburg (DE); Karsten Huster, Bad Iburg (DE)

(73) Assignee: CANON EUROPA N.V., Amstelveen (NL)

( * ) Notice: Subject to any disclaimer, the term of this patent is extended or adjusted under 35 U.S.C. 154(b) by 0 days.

(21) Appl. No.: 14/826,943

(22) Filed: Aug. 14, 2015

(65) Prior Publication Data
US 2015/0355866 A1    Dec. 10, 2015

Related U.S. Application Data

(63) Continuation of application No. 12/353,052, filed on Jan. 13, 2009.

(51) Int. Cl.
*G06F 3/12* (2006.01)
*H04L 29/08* (2006.01)

(52) U.S. Cl.
CPC ............ *G06F 3/126* (2013.01); *G06F 3/1204* (2013.01); *G06F 3/1288* (2013.01); *H04L 67/125* (2013.01); *H04L 67/327* (2013.01)

(58) Field of Classification Search
None
See application file for complete search history.

(56) References Cited

U.S. PATENT DOCUMENTS

| | | | | |
|---|---|---|---|---|
| 5,371,888 A * | 12/1994 | Lehnertz | ................. | G06F 9/546 710/20 |
| 2001/0048833 A1* | 12/2001 | Katsuda | ................ | G06F 3/1204 400/76 |
| 2002/0044296 A1* | 4/2002 | Skaanning | .......... | G06F 11/0733 358/1.14 |
| 2002/0063886 A1* | 5/2002 | Johnson | ................ | G06F 3/1203 358/1.15 |
| 2002/0085850 A1* | 7/2002 | Nakata | ................... | G06F 3/1288 399/66 |
| 2002/0105671 A1* | 8/2002 | Sugahara | .............. | G06F 3/1211 358/1.15 |
| 2002/0131059 A1* | 9/2002 | Tsuchitoi | .............. | G06F 21/608 358/1.1 |
| 2002/0183988 A1* | 12/2002 | Skaanning | ............. | G06N 7/005 703/2 |
| 2003/0002077 A1* | 1/2003 | Shima | ................... | G06F 3/1222 358/1.15 |
| 2003/0011805 A1* | 1/2003 | Yacoub | ................ | G06F 3/1204 358/1.15 |

(Continued)

Primary Examiner — Ming Hon
(74) Attorney, Agent, or Firm — Fitzpatrick, Cella, Harper & Scinto (57) ABSTRACT

A network printing system includes user devices, printing devices, a print server, and a logon server. The print server includes a print queue arranged to store print jobs received from the user devices and to send stored print jobs to the printing devices. The logon server is arranged to store logon details for users of the user devices and to store printer information for the users. The print server is arranged to select a printing device to which to send a print job stored in the queue based on the printer information stored in the logon server for the user of the user device from which the print job originated.

9 Claims, 6 Drawing Sheets

(56) References Cited

U.S. PATENT DOCUMENTS

| | | | |
|---|---|---|---|
| 2003/0014368 A1 | 1/2003 | Leurig et al. | 705/64 |
| 2003/0084153 A1* | 5/2003 | Sedky | H04L 29/06 |
| | | | 709/226 |
| 2003/0103234 A1* | 6/2003 | Takabayashi | H04N 1/00132 |
| | | | 358/1.15 |
| 2003/0160997 A1* | 8/2003 | Kimura | G06F 3/1219 |
| | | | 358/1.15 |
| 2004/0061890 A1* | 4/2004 | Ferlitsch | G06F 3/1205 |
| | | | 358/1.15 |
| 2004/0148335 A1* | 7/2004 | Keeney | G06F 3/1204 |
| | | | 709/201 |
| 2004/0184070 A1* | 9/2004 | Kiraly | G06F 3/1205 |
| | | | 358/1.15 |
| 2005/0030572 A1* | 2/2005 | Tsuchitoi | H04L 69/22 |
| | | | 358/1.13 |
| 2005/0141007 A1* | 6/2005 | Shirai | G06F 3/0486 |
| | | | 358/1.13 |
| 2005/0141023 A1* | 6/2005 | Yagita | G06F 3/1212 |
| | | | 358/1.15 |
| 2006/0044607 A1* | 3/2006 | Kato | G06F 3/1222 |
| | | | 358/1.15 |
| 2007/0146778 A1* | 6/2007 | Kitagata | G06F 3/1204 |
| | | | 358/1.15 |
| 2008/0180699 A1* | 7/2008 | Selvaraj | G06F 3/1204 |
| | | | 358/1.1 |
| 2008/0204798 A1* | 8/2008 | Taniguchi | G06F 3/1204 |
| | | | 358/1.15 |
| 2009/0153900 A1* | 6/2009 | Ishikawa | G06F 3/1213 |
| | | | 358/1.15 |
| 2009/0174894 A1* | 7/2009 | Kamijo | G06F 21/608 |
| | | | 358/1.15 |

* cited by examiner

NETWORK PRINTING SYSTEM FOR TRANSFERRING PRINT JOBS BASED ON NUMBERS OF PAGES

CROSS REFERENCE TO RELATED APPLICATION

This application is a continuation of U.S. application Ser. No. 12/353,052 filed on Jan. 13, 2009, the entire disclosure of which is hereby incorporated by reference herein.

The present invention relates to a network printing system.

Figure 1:
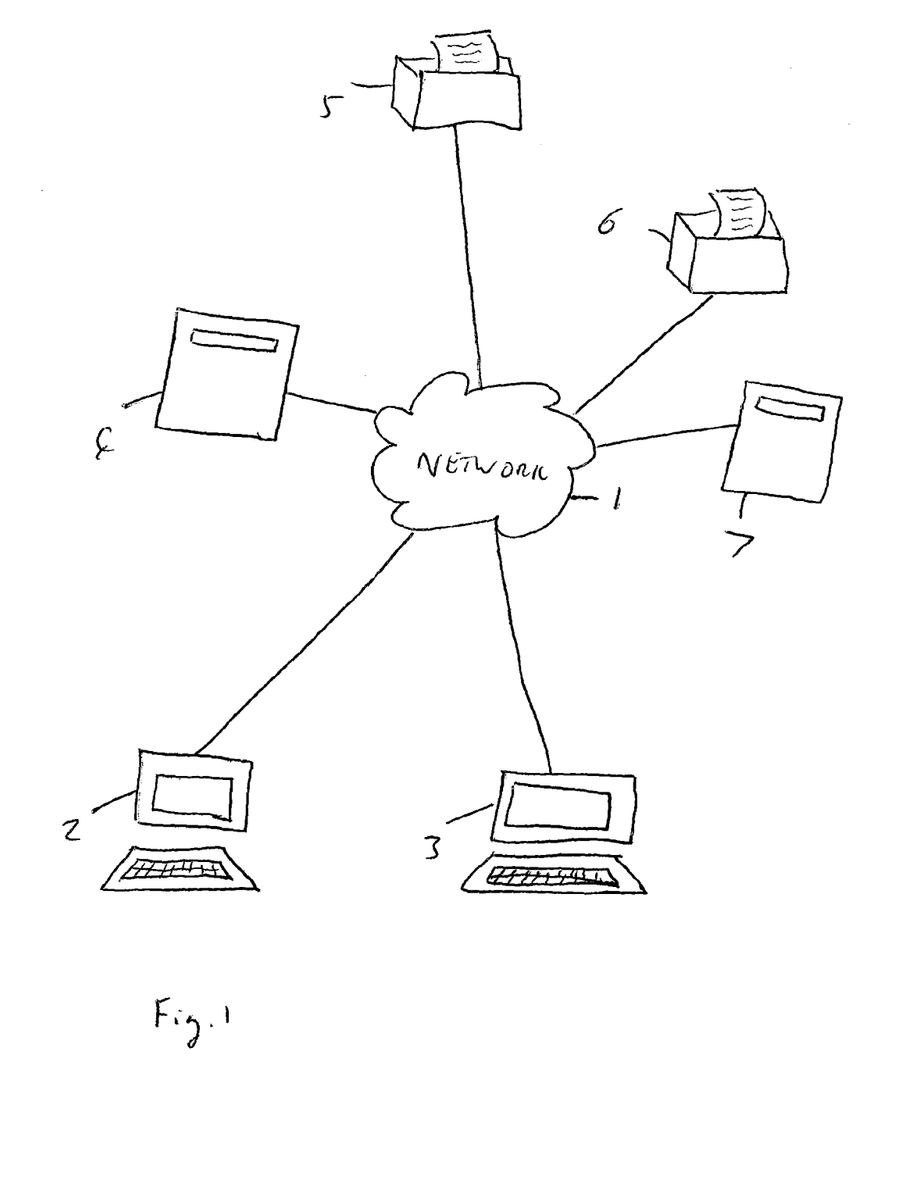
FIG. 1 shows a known network printing system.

A known network printing system is shown in FIG. 1. The system comprises a local area network 1. Connected to the network are personal computers 2 and 3, a print server 4, printers 5 and 6, and a logon server 7. The printers 5 and 6 may be dedicated printers, or may for example be multi-function devices such as a combined photocopier, scanner and printer (an "MFP").

The logon server 7 contains a database of user credentials, such as the Windows™ "Active Directory". When a user wishes to use a device sin the network (such as the personal computer 2), they log on to the device using their user credentials (for example a username and password). The use credentials are then checked against those stored in the database on the logon server 7, and if they are satisfactory the user is logged on to the device.

Figure 2:
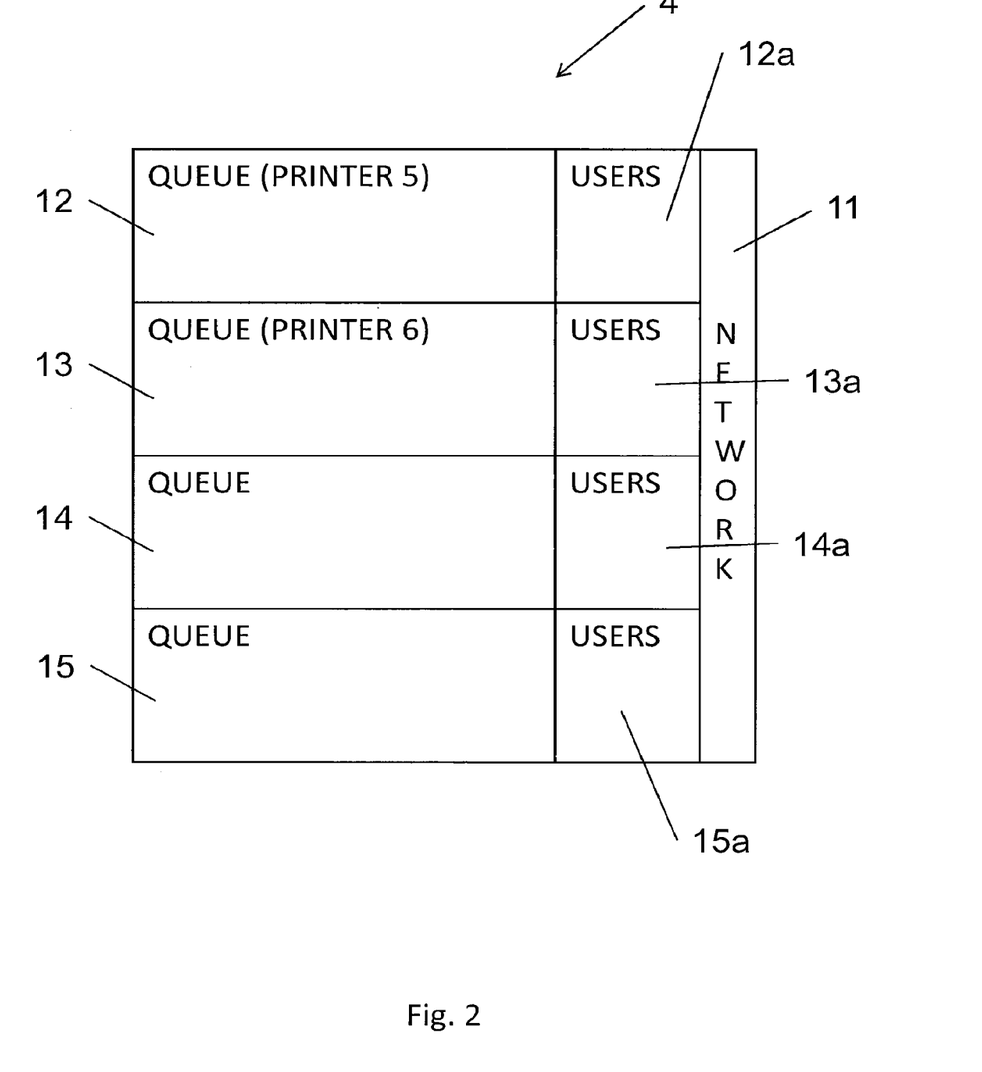
FIG. 2 shows a known print server.

The printer server 4 is shown in more detail in FIG. 2. The print server 4 has a network interface 11, for communication over the network 1 with devices such as the personal computers 2 and 3 and printers 5 and 6. The print server 10 comprises print queues 12 to 15 for storing print jobs from e.g. the personal computers 5 and 6. Each print queue stores the print jobs for a particular printer; thus, print queue 12 stores print jobs for printer 5, and print queue 13 stores print jobs for printer 6. Each of the print queues 12 to 15 has a respective permission store 12a to 15a, which lists the users that are permitted to print on the printer corresponding to the print queue. The users are identified according to the use credentials stored on the logon server 7.

To allow a user to print documents on printer 5 using personal computer 3 (for example), a printer driver for printer 5 is installed on personal computer 3. When the user sends a document for printing on printer 5, a print job corresponding to the document is created and sent to the print server 4 by the printer driver for printer 5. The print serves 4 checks whether the user is permitted to print on printer 5, by checking their user credentials against the permissions store 12a, and if so the print job is stored in print queue 12. (If not, the print job is rejected.) When printer 5 is ready to receive the print job, and all previous print jobs for printer 5 in the print queue have already been sent, the print job is sent to the printer 5 for printing.

If, on the otter hand, a user wishes to print documents on printer 6 using personal computer 3, a further printer driver for printer 6 must be installed on personal computer 3. Print jobs created by the print driver are sent to the print server 4 and, if the user's credentials are in the permissions store 13a, the print job is stored in the print queue 13 and in due course sent to printer 6.

Consequently, for each printer a corresponding print queue is required on the print server 4, and a printer driver must be installed on each device which is to print using that printer.

Although the known system of FIGS. 1 and 2 works satisfactorily when there are a small number of users, personal computers and printers, in larger setups (say hundreds or thousands of users) administration of the system can become onerous, due to the number of printer drivers that may need to be installed on each personal computer, the setting up of the permission for users of each printer, and the explaining to users which printer they should use. This is particularly the case if a user moves location, as the administrator has to identify which of the many printers the user should be able to access, grant access for the user to those printers and remove their permissions for printers they will no longer use. The installation of new printer drivers on personal computers used by the user may also be required.

In order to allow a number of printers to be used by a user of a personal computer without corresponding printer drivers for each printer having to be installed on the personal computer, it is known to use the printers as a printer "pool". A single print queue, say print queue 14, for the printer pool is provided on the print server 4. To allow a user of personal computer 3 (for example), a single print driver for the printer pool is installed on personal computer 5. A print job created by the print driver is sent to print server 4, where it is stored in print queue 14, for example. Print jobs in the print queue are then sent to any of the printers in the printer pool whenever they are ready to receive them.

A user can only select the printer pool as a whole on which to print a document, and cannot select which printer or printers within the pool on which a document should be printed. Further, once a document has been printed the user does not know on which printer within the printer pool the printing occurred. Consequently, unless all printers in a printer pool are located in the same place, a user will not know where to go to retrieve their printed document. All printers in a printer pool must also be of the same type with the same setup, as a print job corresponding to a document to be printed must be suitable for printing on any of the printers in the printer pool.

It would be desirable to be able to provide a system that avoided or mitigated the disadvantages of the known network printing systems.

In accordance with a first aspect of the present invention, there is provided a network printing system comprising:

a plurality of user devices;

a plurality of printing devices;

a print server comprising a print queue arranged to store print jobs received from the user devices, and to send stored print jobs to the printing devices;

a logon server arranged to store logon details for users of the user devices;

wherein the logon server is further arranged to store printer information for the users, and wherein the print server is arranged to select a printing device to which to send a print job stored in the queue based on the printer information stored in the logon server for the user of the user device from which the print job originated.

Such a network printing system allows information about the printers which can be used by a use to be administered on the logon server only, without user permissions having to be set on each printer a use may use, or may have previously used if a user changes location for example.

Advantageously, each of the plurality of user devices comprises a single printer driver for creating and sending print jobs to the queue on the print server. Advantageously, the print server may comprise a single print queue for storing all received print jobs. This allows an administrator to easily administer all print jobs being printed using the network printing system.

Alternatively, the print server comprises a plurality of print queues, and the print server is arranged to select the print queue in which to store a print job based on the properties of the print job. Advantageously, the selection of the print queue does not depend upon the printer information for the user stored in the logon server.

In accordance with a second aspect of the present invention, there is provided a method of printing print jobs on a network printing system, comprising the steps of:

in response to a user attempting to log out to a user device, validating the user's credentials using a logon server;

sending a print job from the user device to a print server;

storing the print job in a queue on the print server;

selecting a printer on which to print the print job based on printer information for the user stored in the logon server.

Advantageously, each print job sent to the print server is stored in a single print queue.

Alternatively, the print server selects a print queue in which to store the print job based on the properties of the print job. Advantageously, the selection of the print queue does not depend upon the printer information for the user stored in the logon server.

In accordance with a third aspect of the present invention, there is provided a print server comprising a print queue arranged to store print jobs received from user devices, and to send stored print jobs to printing devices;

wherein the print server is arranged to select a printing device to which to send a print job stored in the queue based on printer information stored in a logon server in association with logon details for the user of the user device from which the print job originated.

In accordance with a fourth aspect of the present invention, there is provided a computer-implemented method of processing print jobs at a print server in a network printing system, comprising:

receiving a print job from a user device at the print server;

storing the print job in a queue on the print server;

selecting a printer on which to print the print job based on printer information stored in a logon server in association with logon details for the user of the user device from which the print job originated; and transferring the print job to the selected printer.

In accordance with a fifth aspect of the present invention, there is provided a set of computer program product that when executed on a set of devices provides the network printing system as claimed in any of claims 1 to 5.

In accordance with a sixth aspect of the present invention, there is provided a set of computer program products that when executed perform the steps of the method of any of claims 6 to 9.

There will now be described embodiments of the invention, with reference to the accompanying drawings of which.

Figure 3:
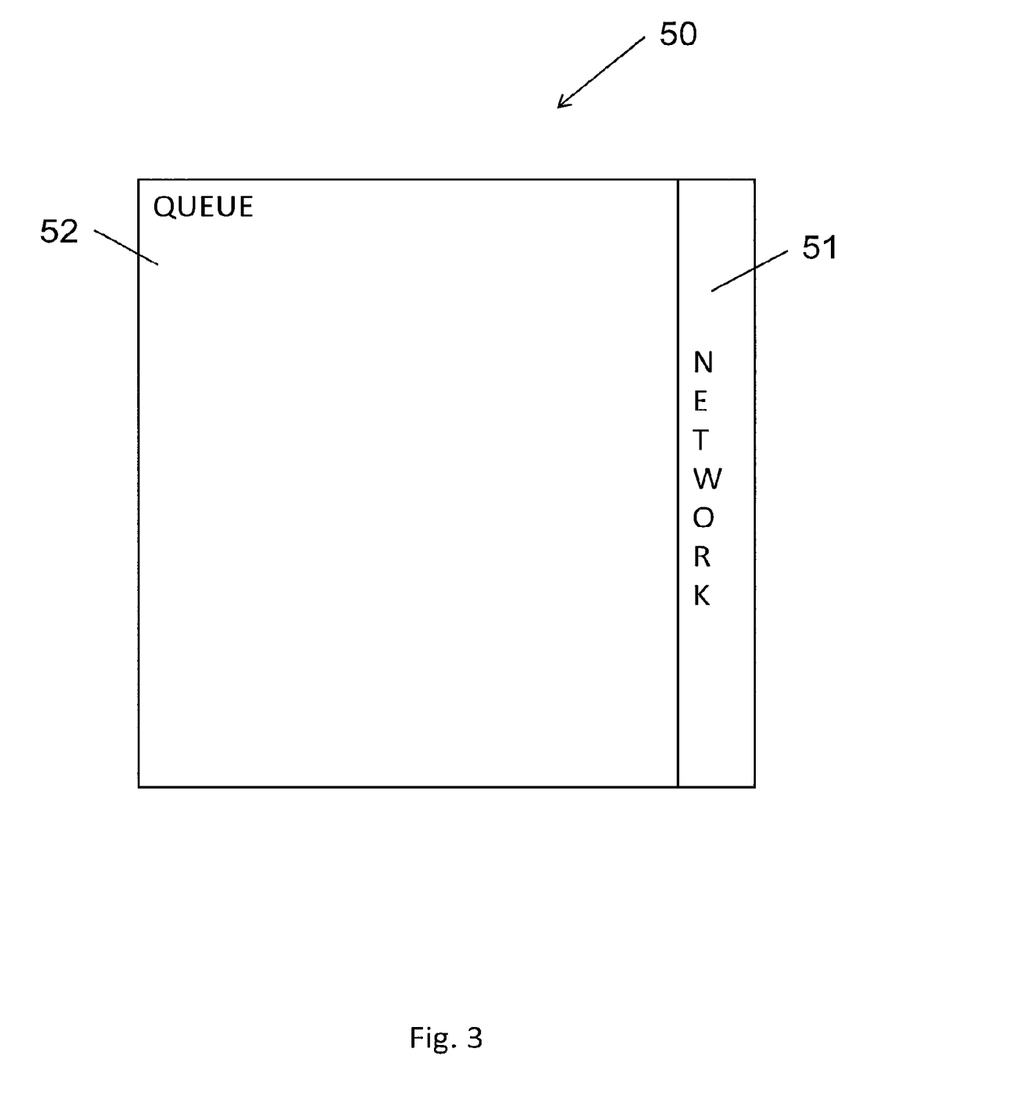
FIG. 3 shows a print server in accordance with an embodiment of the present invention.

A print server 50 in accordance with an embodiment of the present invention is shown in FIG. 3. The print server 50 may be used in a network printing system such as that shown in FIG. 1, with the print server 50 replacing the known print server 4, as described below.

As before, the print server comprises a network interface 51 for communication over the network 1. The print server 50 further comprises a single print queue 52 for storing print jobs.

Figure 6:
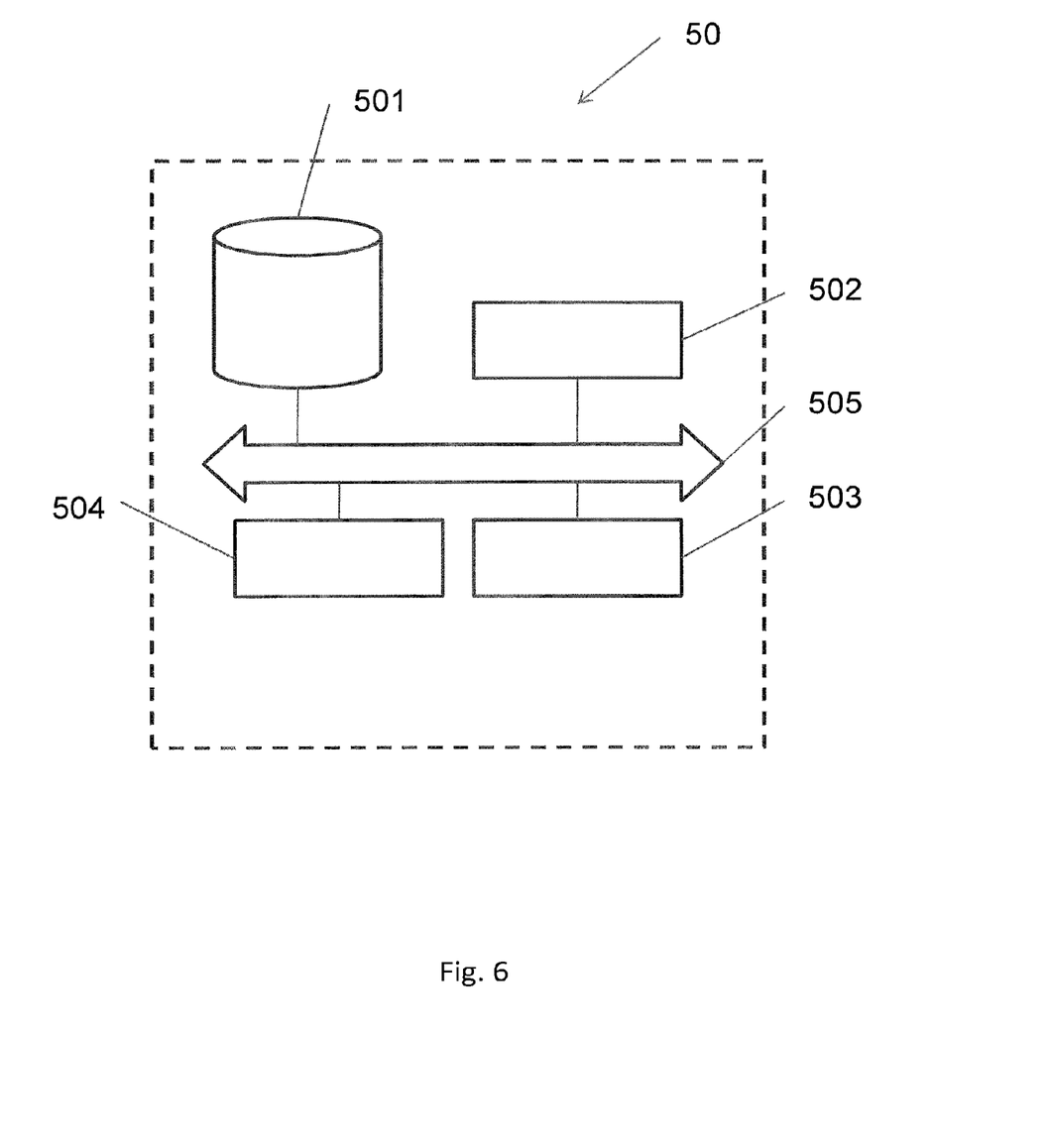
FIG. 6 is a structural diagram of the print server of FIG. 3.

A structural diagram of the print server 50 is shown in FIG. 6. Each of the parts of the system is connected to a communications bus 505, by which they communicate. The print server 50 comprises a hard disk 501 for long-term storage of data, for example data relating to print jobs stored in the print queue, and a random access memory 502 for storing data that needs to be accessed quickly, for example data relating to print jobs that are being processed. The print server 50 further comprises a network module 503 which provides the network interface 51 for communication with other devices over the network 1. Finally, the print server 50 is controlled by a central processing unit 504.

The logon server 7 stores printer information for each user along with their logon credentials. This printer information is used to define a default printer for each user.

On each device that a user uses on the network such as the personal computers 2 and 3, a particular printer driver is installed for sending documents to the print server 50. The particular print driver is configured for printing to the printer identified as the user's default printer on the logon server.

Figure 4:
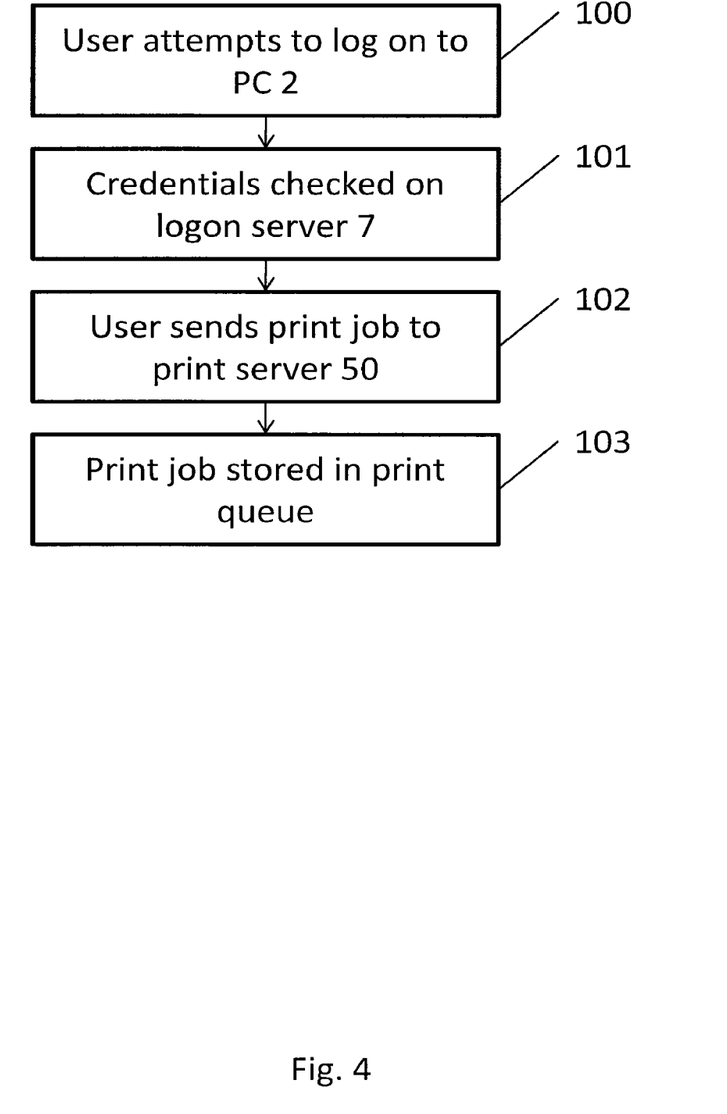
FIG. 4 is a flow chart showing the steps of sending a print job to the print server in accordance with the present invention.

FIG. 4 is a flow chart showing the steps of sending of a print job to the print server. First, a user attempts to log on to one of the user devices on the network 1, in this case personal computer 2 (step 100). The user's logon credentials are checked against those stored in the database on the logon server 7, and if satisfactory then the user is successfully logged on (step 101). A user then sends a print job to the print server 50 using the printer driver (step 102) for the user's default printer. The print server 50 stores the print job in the single print queue 52 (step 103). The print job is stored along with details identifying the user as having sent the print job.

Figure 5:
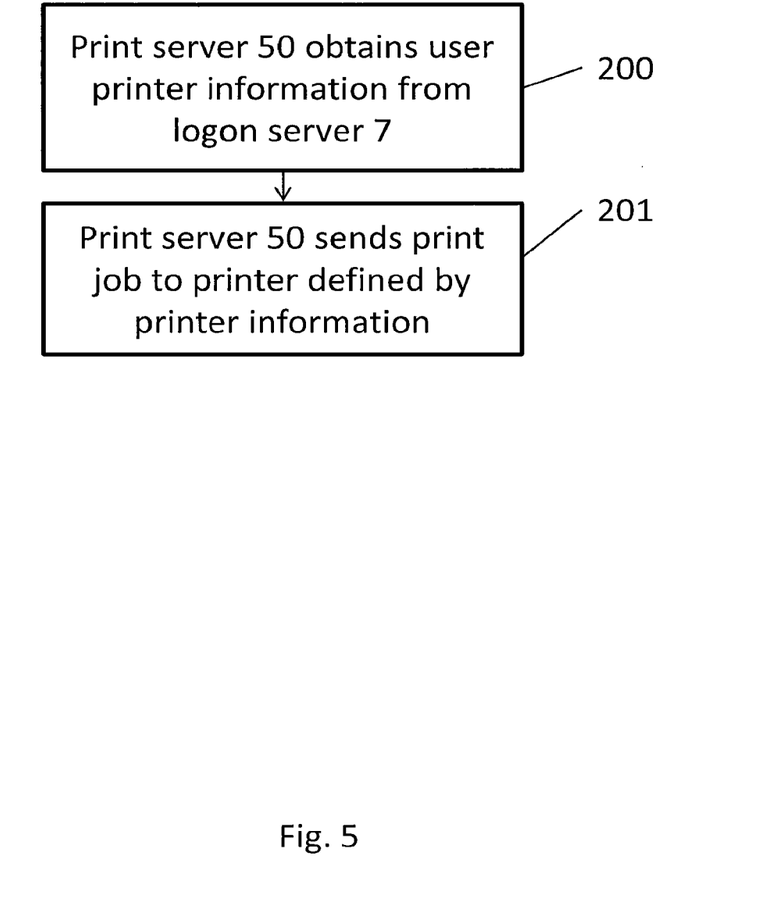
FIG. 5 is a flow chart showing the steps of printing a print job by the print server in accordance with the present invention.

The print server 50 processes print jobs in the print queue 52 in the order they were received by the print server 50. FIG. 5 is a flow chart showing the steps of printing of a print job by the print server 50. First, the print server 50 obtains from the logon server 7 the printer information associated with the user (step 200). (As mentioned above details identifying the user who sent the print job are stored along with the print job in the single print queue 52.) The print server 50 then sends the print job to the printer defined by the printer information obtained from the logon server 7 (step 201).

In the network printing system of the present embodiment, administration of a user's printer details is done by changing their printer information on the logon server 7. When a user changes location (for example), and so will use a new printer, the administrator simply sets their default printer information on the logon server 7 to be the new printer. This is sufficient to allow the user to use the new printer, and also to prevent them from using their previous printer; the administrator does not need to make any changes to any information on the previous and new printers themselves.

In an alternative embodiment of the present invention, the print server 50 includes a secure print queue. The secure print queue stores print jobs sent to it and releases the print jobs to a printer 5 or 6 in response to a request from the printer. In use a user sends a job to the secure print queue. The user then selects a printer 5 or 6 that has logon and secure printing functionality. When the user logs on the appropriate printer, the printer displays a list of print jobs to the user. The user may login using the same details that he used to logon to the user device or use other identification, such as an ID card, associated with his user profile on the logon server. The displayed list of print jobs is sent to the printer from the print server 50 and corresponds to those print jobs in the secure print queue sent by the user i.e. those print jobs in the secure print queue that have the user's identity stored in association with them.

In the alternative embodiment, the print server 50 has a print queue according to the first embodiment (hereinafter "insecure print queue") and a secure print queue. In the alternative embodiment rules may be set up on the print server 50 in connection with the use of the print queues. For example, in a particular embodiment, a rule is set up on the print server 50 to transfer any job sent to the insecure print queue that is greater than a predetermined number of pages, for example 50 pages, to the secure print queue. (Such a print job may be initially stored in the insecure print queue and then transferred to the secure print queue after it has been determined that it satisfies the relevant rules; alternatively the print queue in which a print job should be stored may be determined immediately, and the print job transferred to the secure print queue without ever being stored in the insecure print queue.)

This prevents large print jobs from being printed until the user logs in to the relevant printer and specifically requests that they are printed, thus giving the user an opportunity to decide not to print them and so save paper. Print jobs of 50 pages or less, on the other hand, are stored in the insecure print queue, and so are printed without the user needing to log in to the printer.

The rules for transferring print jobs from one print queue to the other may be implemented by a print management program installed on the server.

The invention claimed is:

1. A network printing system comprising:
    a plurality of user devices;
    a plurality of printing devices each configured so that a user may log on to the printing device;
    a print server, comprising a first print queue of a plurality of print queues, arranged to store print jobs received from the user devices and to send stored print jobs to the printing devices; and
    a logon server arranged to store logon details for a plurality of users of the user devices and printer information defining a default printer for each of the plurality of users of the user devices,
    wherein the print server is further arranged to select a printing device to which to send a print job stored in first the print queue so as to transfer a print job between the first print queue and a second print queue if the number of pages of the print job is greater than a predetermined number of pages, and further arranged to transfer print jobs having a number of pages greater than the predetermined number of pages from the second print queue of said plurality of print queues to the printing device in response to a request from a printing device and arranged to transfer print jobs having the predetermined number of pages or fewer from the first print queue to a printing device selected for that job based on the printer information stored in the logon server.

2. The network printing system claimed in claim 1, wherein each of the plurality of user devices comprises a single printer driver for a user to create and send print jobs to the print queue on the print server.

3. The network printing system claimed in claim 1, wherein the transfer of the print job does not depend upon the printer information for the user stored in the logon server.

4. A computer-implemented method of printing print jobs on a network printing system, the network printing system comprising a plurality of user devices each configured so that a user may log on to the printing device, a plurality of printing devices and a print server, the method comprising:
    in response to a user attempting to log on to one of the plurality of user devices, validating the user's credentials using a logon server storing logon details for the user and storing printer information for the user, wherein the printer information defines a default printing device for the user;
    the one of the plurality of user devices sending a print job to the print server;
    the print server storing the print job in a first print queue on the print server, wherein the print server transfers a print job between the first print queue and a second print queue if the number of pages of the print job is greater than a predetermined number of pages;
    the print server selecting a printing device on which to print the print job so as to transfer print jobs having a number of pages greater than the predetermined number of pages from the second print queue in response to a request from a printer and arranged to transfer print jobs having the predetermined number of pages or fewer from the first queue to a selected printing device based on printer information for the user stored in the logon server.

5. The computer-implemented method claimed in claim 4, wherein the transfer of the print job does not depend upon the printer information for the user stored in the logon server.

6. A print server comprising a first print queue arranged to store print jobs received from user devices and to send stored print jobs to printing devices,
    wherein the print server is arranged to select a printing device to which to send a print job stored in the print queue based on printer information, defining a default printing device for each user of the user devices, stored in a logon server in association with logon details for the user of the user device from which the print job originated, and
    wherein the print server, comprising a plurality of print queues, is further arranged to transfer a print job between the first print queue and a second print queue if the number of pages of the print job is greater than a predetermined number of pages, and further arranged to transfer print jobs having a number of pages greater than the predetermined number of pages from the second print queue of said plurality of print queues to the printing device in response to a request from a printing device and arranged to transfer print jobs having the predetermined number of pages or fewer from the first print queue to a printing device selected for that job based on the printer information stored in the logon server.

7. A computer-implemented method of processing print jobs at a print server in a network printing system, the method comprising:
    receiving a print job, from a user device, at the print server;
    storing the print job in a first print queue on the print server wherein the print server transfers a print job between the first print queue and a second print queue if the number of pages of the print job is greater than a predetermined number of pages;

transferring print jobs having a number of pages greater than the predetermined number of pages from the second print queue of said plurality of print queues to the printing device in response to a request from a printing device and transferring print jobs having the predetermined number of pages or fewer from the first print queue to a printing device selected for that job based on printer information stored in a logon server in association with logon details of a user of the user device from which the print job originated, wherein the printer information defines a default printing device for the user.

8. A set of computer program products stored on non-transitory computer-readable storage media that when executed on a set of devices provides a network printing system comprising:

a plurality of user devices;

a plurality of printing devices;

a print server, comprising a first print queue arranged to store print jobs received from the user devices and to send stored print jobs to the printing devices; and a logon server arranged to store logon details for a plurality of users of the user devices, wherein the logon server is further arranged to store printer information for the plurality of users, wherein the printer information defines a default printer for each of the plurality of users, and wherein the print server is arranged to select a printing device to which to send a print job stored in the first print queue based on the printer information stored in the logon server for the user of the device from which the print job originated, wherein the print server comprises a plurality of print queues, and wherein the print server is arranged to transfer print jobs between the first print queue and a second print queue if the number of pages of the print job is greater than a predetermined number of pages, and further arranged to transfer print jobs having a number of pages greater than the predetermined number of pages from the second print queue of said plurality of print queues to a printing device in response to a request from the printing device and arranged to transfer print jobs having the predetermined number of pages or fewer from the first print queue to a printing device selected for that job based on the printer information stored in the logon server.

9. A set of computer program products stored on non-transitory computer-readable storage media that when executed perform the steps of a method of printing print jobs on a network printing system, the method comprising:

in response to a user attempting to log on to a user device, validating the user's credentials using a logon server storing logon details for the user and storing printer information for the user, wherein the printer information defines a default printing device for the user;

sending a print job from the user device to a print server;

storing the print job in a first print queue on the print server, wherein the print server transfers a print job between the first print queue and a second print queue if the number of pages of the print job is greater than a predetermined number of pages;

selecting a printing device on which to print the print job so as to transfer print jobs having a number of pages greater than the predetermined number of pages from the second print queue in response to a request from a printing device and arranged to transfer print jobs having the predetermined number of pages or fewer from the first queue to a selected printing device based on printer information for the user stored in the logon server.

* * * * *